Sept. 28, 1937.     G. F. MYERS     2,094,105
FLYING MACHINE
Original Filed Aug. 8, 1933     7 Sheets-Sheet 1
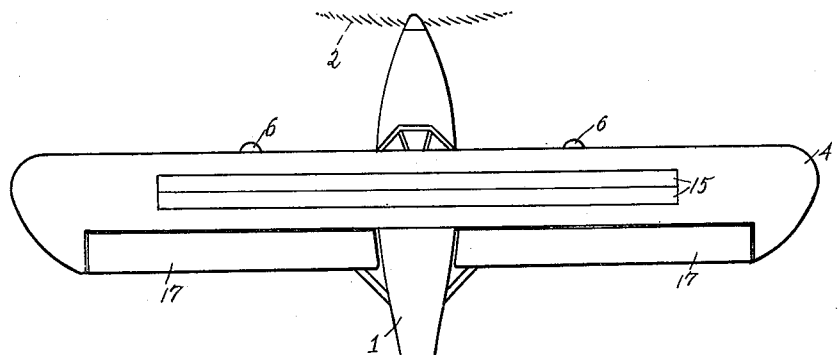
Fig. 1.
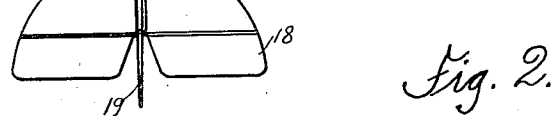
Fig. 2.
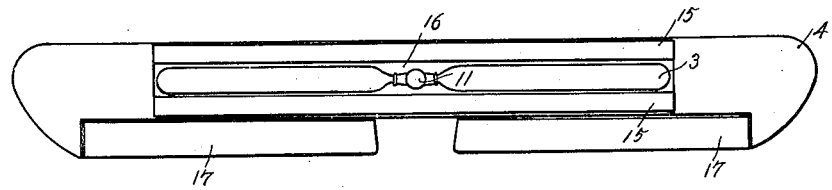
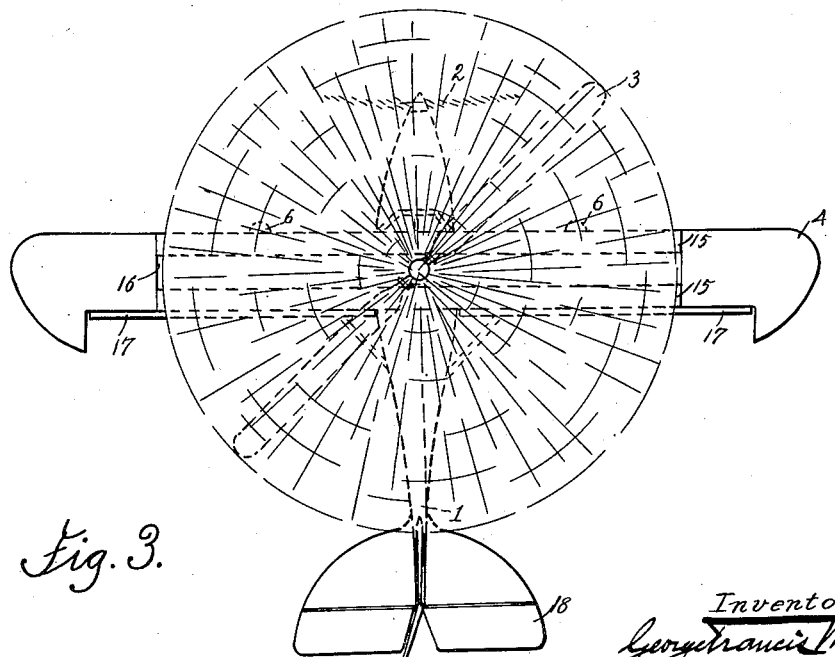
Fig. 3.
Inventor:
George Francis Myers Sept. 28, 1937.  G. F. MYERS  2,094,105
FLYING MACHINE
Original Filed Aug. 8, 1933   7 Sheets-Sheet 2

Inventor:
George Francis Myers

Sept. 28, 1937. G. F. MYERS 2,094,105
FLYING MACHINE
Original Filed Aug. 8, 1933 7 Sheets-Sheet 3

Inventor:
George Francis Myers

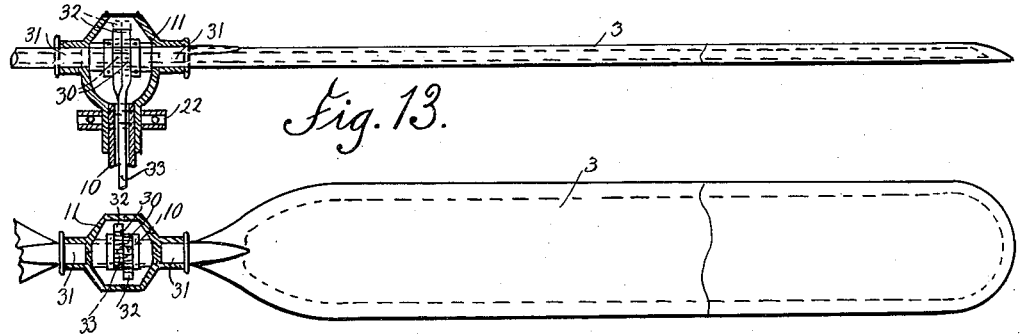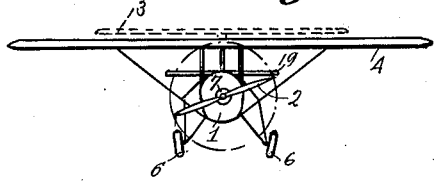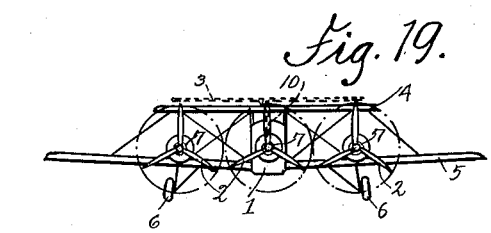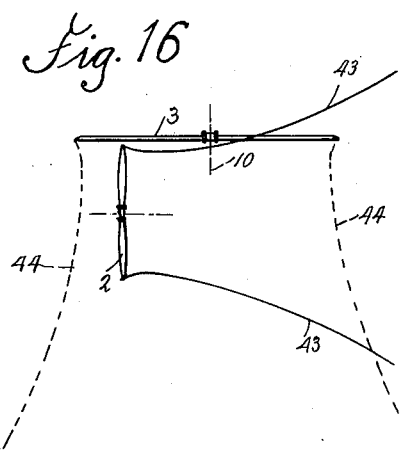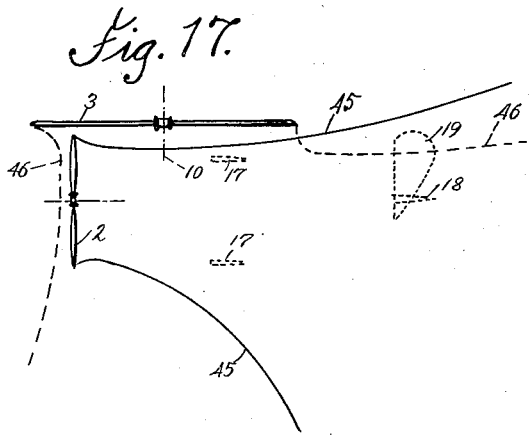

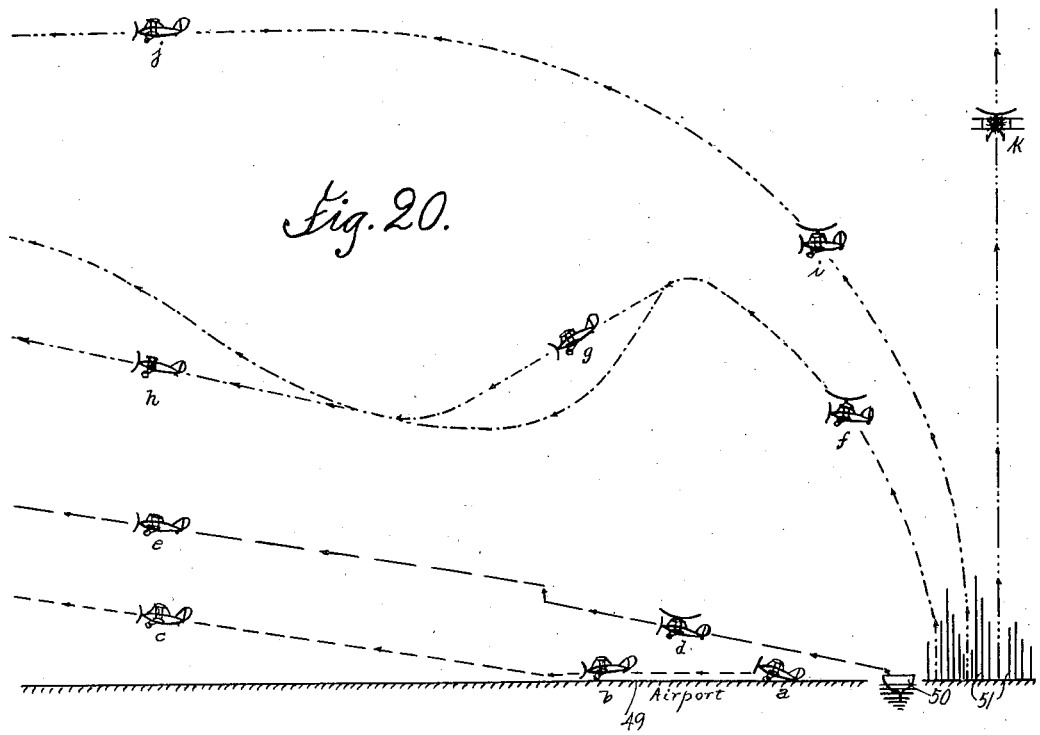
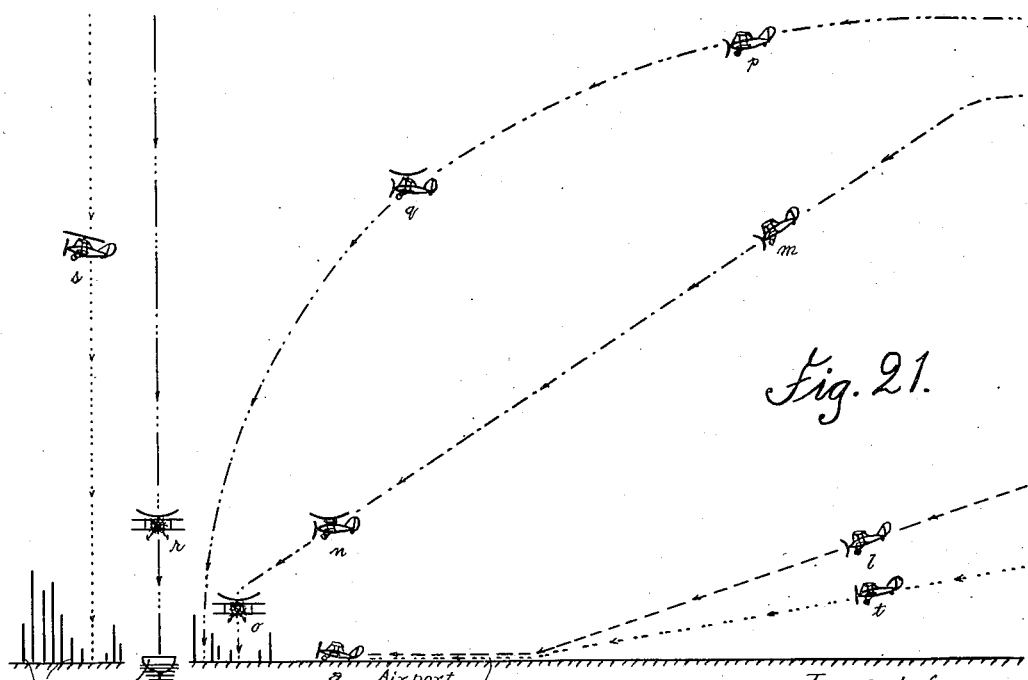

Sept. 28, 1937.　　　G. F. MYERS　　　2,094,105
FLYING MACHINE
Original Filed Aug. 8, 1933　　7 Sheets-Sheet 6

Inventor:
George Francis Myers

Sept. 28, 1937. G. F. MYERS 2,094,105
FLYING MACHINE
Original Filed Aug. 8, 1933 7 Sheets-Sheet 7
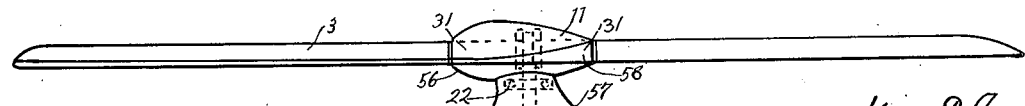
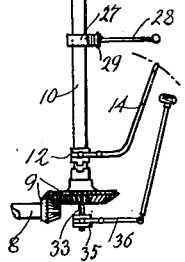
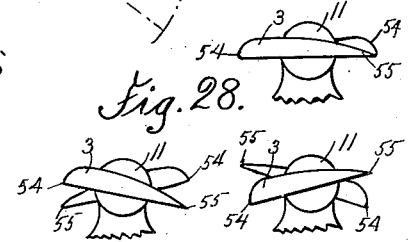
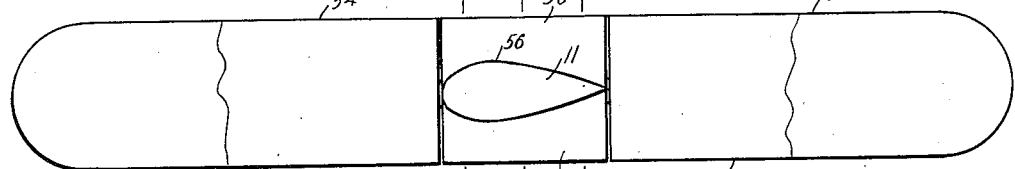
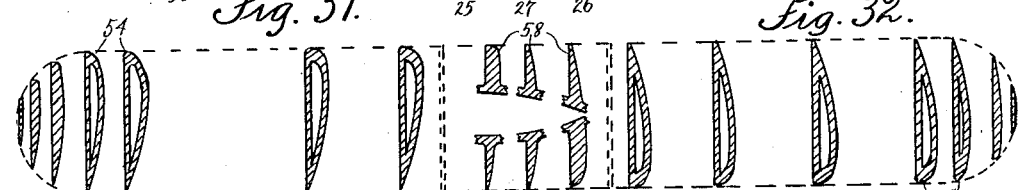
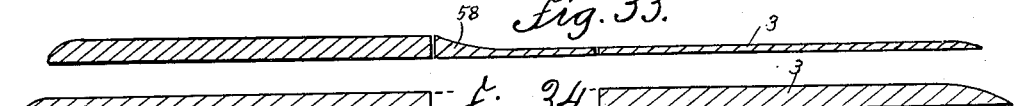
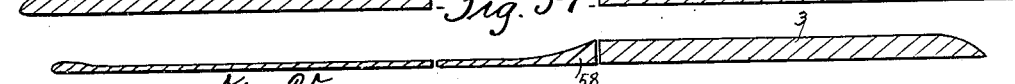
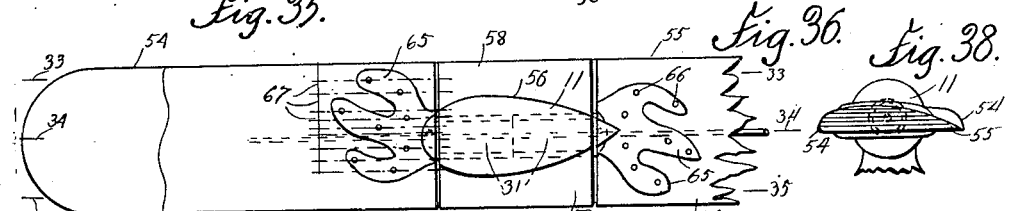

Patented Sept. 28, 1937

2,094,105

UNITED STATES PATENT OFFICE 2,094,105

FLYING MACHINE

George Francis Myers, New York, N. Y.

Application August 8, 1933, Serial No. 685,158
Renewed March 30, 1937

14 Claims. (Cl. 244—15)

This invention relates to flying machines, and particularly to that class thereof known as helicopters.

It has for its object to produce a machine that will rise, land and fly exactly in the same way as an ordinary airplane when at an airport; but will also rise, land and fly like a helicopter from any restricted place as from the deck of a ship, without any run.

Still further objects to be achieved by the present invention are: a machine having a front or airplane or propulsive propeller, and a top or helicopter or lifting propeller; a machine having the ordinary controls of the present day airplane washed by the slipstreams of both the front and top propellers; a machine in which the stabilization on its three principal axes is accomplished by having the slipstream from the front propeller blow over the ailerons, elevator and rudder; a machine in which the torque is taken care of by the slipstream of the front propeller, or by the front and top propellers, striking the obliquely placed face of the vertical rudder; a machine that will rise vertically with both propellers working, the angle of incidence of the fuselage being kept at such an angle that the horizontal component of the top propeller pulling backwards is equal to the horizontal component of the front propeller pulling forward; a machine that when it is desired to go forward slowly, say from one to sixty miles per hour, the rear of the machine can be raised by the elevator so that the angle of incidence of the fuselage is more and more nearly horizontal, the horizontal component of the front propeller becoming greater and greater than that of the top propeller; a machine in which the slipstream from the front and top propellers, the former spraying rearwardly and the latter spraying downwardly are deformed one by the other; a machine in which both the front and top propellers have changeable pitch blades; a machine in which the slipstream from the top propeller, instead of being allowed to strike perpendicularly on the top of the wing surface is forced backward by the slipstream of the front propeller so that it will strike the top of the wing a glancing blow; a machine having the helicopter propeller retractable inside the wing; a wing having an elongated rectangular space or box in which the retracted propeller may lie; means for opening up the top portion of the wing to admit the helicopter propeller; opening up both the top surface and the bottom surface of the wing when retracting the top propeller; the space or box provided with hinged covers; the space or box provided with covers sliding longitudinally of the machine; recessing the top portion of the ribs of the wing to admit the helicopter propeller; means for automatically lifting the propeller from its retracted to its open position, the same means permitting the retracting of the propeller within the wing; means for changing the pitch of the blades of the helicopter propeller from the inside of its hollow shaft; a jaw clutch on the helicopter propeller shaft thrown in while the propeller is turning, by reversing the blades from positive to negative pitch and permitting the wind to turn the shaft as fast or faster than the motor is turning the same; throwing out the jaw clutch when the shaft is running by the same general method; turning the propeller shaft by hand when not power driven by a ratchet device so as to bring the propeller transverse to the machine and in line with the box into which it is to be retracted; throwing off the compression in the motor when the same goes dead; throwing in more or less compression as a brake to the reversed blades of the helicopter propeller; a machine when the power stops that can come down vertically with its helicopter propeller revolving with reversed blades, or can come down in an ordinary glide like an airplane; a machine whose changeable pitch helicopter propeller blades are operated by a rod passing up through the hollow driving shaft of the propeller; means for locking the blades of the helicopter propeller in any desired position; a helicopter propeller which is streamlined from tip to tip and placed longitudinally of the fuselage when not revolving; streamlining the hub of the propeller with side wings which merge into the streamlining of the blades when the same are not revolving and are at a zero angle of incidence fore and aft of the machine; placing the thrust bearing of the helicopter propeller just below the hub of the same above the wing and streamlining the same and its braces into the wing; connecting up the hollow vertical shaft and the hollow hub as well as the hollow blade of the helicopter propeller to the exhaust of the engine so that the heat from the same will thaw out and melt away any ice collected thereon; using the vertical rudder as a hovering rudder when going up vertically as well as a torque eliminator; rising more or less vertically until a height of some six hundred feet more or less is reached, stopping the helicopter propeller, placing the machine in a power glide or even a power dive to gain forward speed in the air instead of on the ground as usual; coming to a landing with front propeller idling till nearly over the spot on which it is desired to land and then switching on the helicopter propeller, depending on the drag of the helicopter propeller to slow up the machine in the air and landing vertically; when used by the Navy changing the present catapult for seaplanes into a helicopter landing platform so that it can be used by both the seaplane and the helicopter by providing covers or doors over the present launching rails; providing a system of storing aircraft on battleships, cruisers or the like by placing the same transversely on the vessel and mostly beyond the outer railing thereof; providing a hoist to bring the aircraft from its place on the deck to its storage place and holding the same in boots which grip its ground wheels.

With these and other objects in view the invention consists in the novel construction, combination and arrangement of parts as hereinafter fully described, illustrated and claimed.

In the accompanying drawings of seven sheets:

Figure 1 is a plan view of the preferred embodiment of the invention showing the machine flying forwardly or horizontally through the air with the airplane propeller only operating, the box or receptacle containing the retracted helicopter propeller being closed and the covers thereof conforming to the profile of the airfoil.

Fig. 2 is a plan view of the upper wing of the machine with the box containing the helicopter propeller and exposing the same to view.

Fig. 3 is another plan view of the machine showing the same rising vertically; both the airplane propeller and the helicopter propeller operating conjointly.

Figure 9:
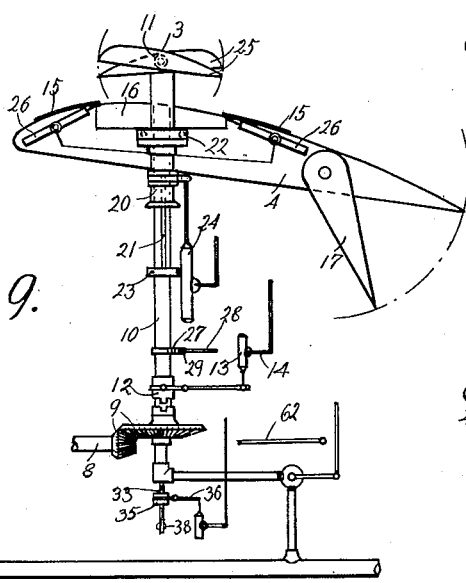

Fig. 9 is a similar section and side elevation showing the blades of the helicopter propeller lifted out of its box by the elevating mehanism; the blades being shown reversely placed; also showing the valve opening mechanism, the reduction gearing and jaw clutch mechanism; the hand ratchet for turning the propeller when the power is off; and the method of heating the hollow blades through the hollow shaft connected to the exhaust pipe, to thaw any ice on the blades.

Figure 4:
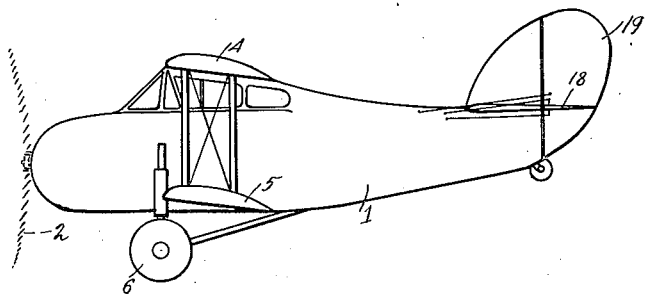
Fig. 4 is a side elevation showing the machine on the ground resting, the helicopter propeller being retracted and stowed away in the upper wing, and showing in dotted lines its connections with the motor.
Figure 5:
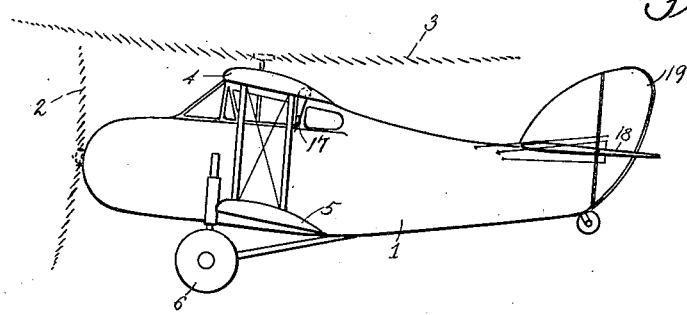
Fig. 5 is a similar side elevation showing the machine rising directly vertically, at approximately the same angle as on the ground; the horizontal components of the two propellers substantially balancing one another.
Figure 6:
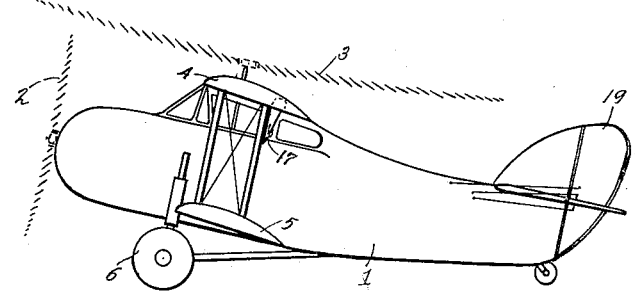
Fig. 6 is a similar side view showing the machine tipped forward some, so that it will travel forward at a comparatively slow speed due to the horizontal component of the front propeller being greater than that of the helicopter propeller.
Figure 7:
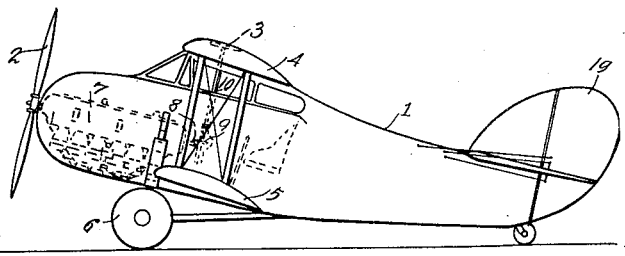
Fig. 7 is a similar side elevation showing the machine traveling horizontally through the air as in Fig. 1, with only the airplane propeller operating; the helicopter propeller being retracted within the upper wing as in Fig. 4.
Figure 8:
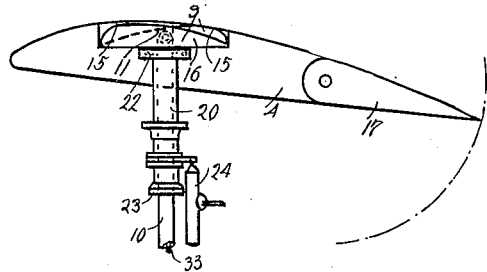
Fig. 8 is a transverse cross section of the upper wing showing the elevating mechanism for lifting the helicopter propeller out of its box.
Figure 10:
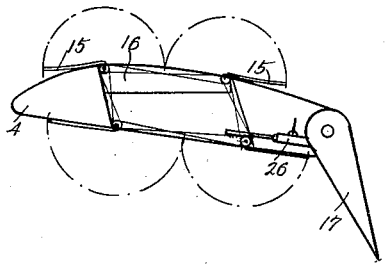

Fig. 10 is a similar section to that of Fig. 8 showing the helicopter propeller box open at both top and bottom, and hinged flaps or covers for closing the same simultaneously operated by a servo motor.

Figure 11:
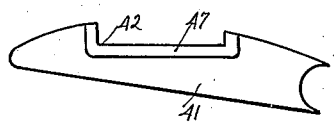

Fig. 11 is a rib showing the indented or cut out portion for receiving the retracted helicopter propeller, and the reinforcement thereon.

Figure 12:
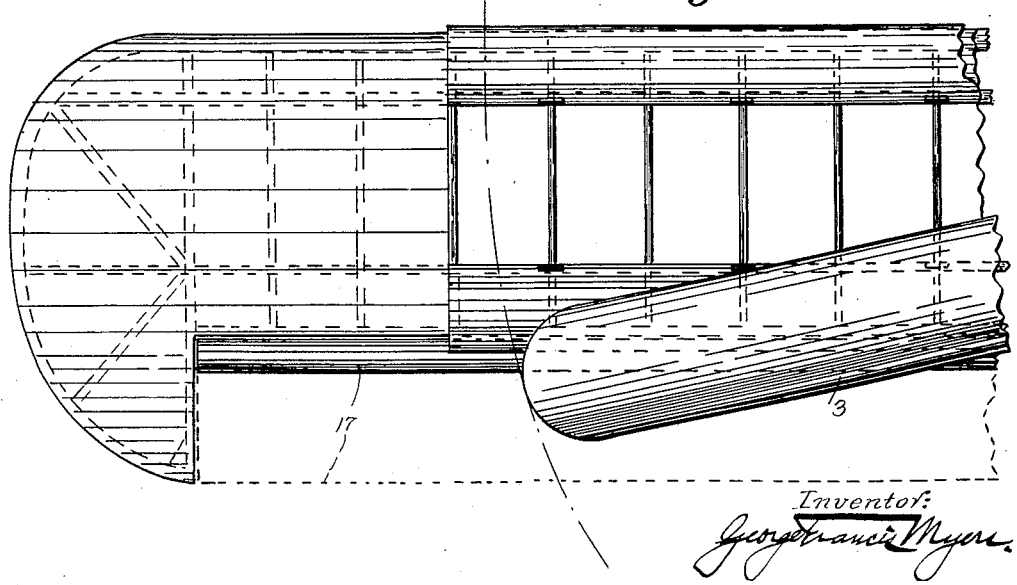

Fig. 12 is a fragmentary plan view of the end of the wing showing the hinged propeller box open top and bottom with a portion of the propeller turning thereover.

Fig. 13 is a side elevation partly in section of one of the blades of the helicopter propeller showing the mechanism for changing the pitch of the propeller blades.

Fig. 14 is a plan view of Fig. 13.

Fig. 15 is a vertical cross section of the mechanism for changing the inclination of the blades, and also the mechanism for hoisting the blades out of the box.

Fig. 16 is diagrammatic view showing the travel of the slipstreams from the airplane and helicopter propellers as each slipstream would appear if operated alone.

Fig. 17 is a similar diagrammatic sketch to Fig. 16 showing the travel of the slipstream of the two propellers when operated simultaneously; how both slipstreams are deformed by one slipstream impinging on the other, yet both flowing over all three of the main controls for stabilization and torque.

Fig. 18 is a front elevation of a parasol monoplane with the helicopter propeller normally held retracted in the wing, but shown extracted in dotted lines.

Fig. 19 is a front elevation of a bi-plane with three sets of airplane propellers washing all of the ailerons; the helicopter propeller being driven by the center engine only.

Fig. 20 is a diagrammatic sketch showing the different ways in which the machine may leave the ground: *a* showing the machine at rest at an airport; at *b* the machine is ready to lift off the ground after its preliminary run from *a* to *b*; at *c* it is flying like any ordinary plane; at *d* the machine is shown as having flown off the deck of a battle ship, or from a very restricted place where no preliminary run was possible; at *e* it is flying like any ordinary airplane; at *f* the machine is shown flying substantially vertically from among tall obstructions; at *g* the propellers retracted and the machine is power gliding; at *h* it is flying like any ordinary plane; at *i* the machine is rising substantially vertically and at *j* is flying like any ordinary plane; at *k* the machine is shown flying perpendicularly from the ground to its ceiling.

Fig. 21 is another diagrammatic sketch similar to that of Fig. 20 showing the different ways in which the machine may land: at *l* the machine is shown coming in to a landing, with the propeller idling, to an airport, coming to rest at *a*; at *m* it is coming in to a vertical landing through *n* and *o*; at *p* and *q* it is coming in to a similar vertical landing; at *r* the machine is shown coming down to the ground vertically under complete control; and at *s* the power has ceased and the pilot has reversed the angularity of his blades and is landing slowly vertically.

Figure 22:
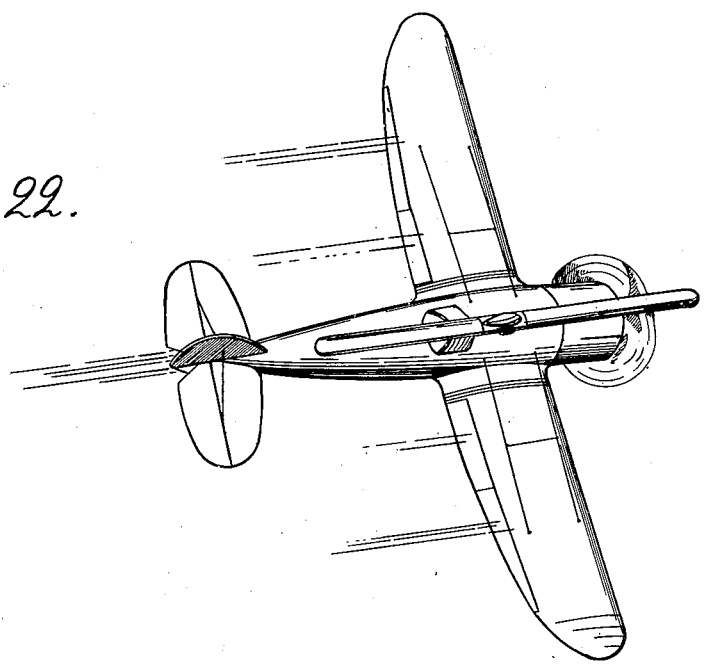

Fig. 22 is a perspective view of a modification of the machine rising vertically from the ground with both the airplane and the helicopter propellers operating.

Figure 23:
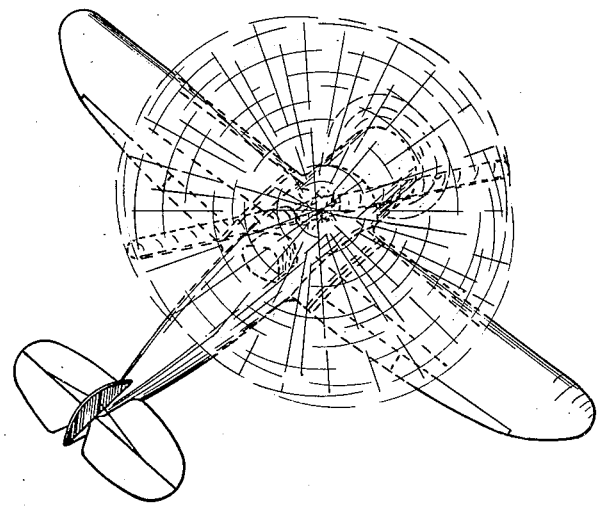

Fig. 23 is a similar perspective view of the machine shown in Fig. 22 flying forwardly, but different from the view shown in Fig. 1 in that the helicopter propeller is not retracted; the propeller is left in its outboard positon parallel to the longitudinal center line of the machine where it will experience the least drag.

Fig. 24 is the side elevation of a wing with a non-retractable helicopter propeller, showing the gearing, the ratchet arrangement, the clutch, the changeable pitch mechanism, and their respective levers.

Figs. 25, 26, and 27 are cross sectional views taken along the lines 25—25, 26—26 and 27—27 respectively of Fig. 31, the hub of the propeller being shown in line horizontally with the two blades.

Figs. 28, 29, and 30 are respectively side elevations of the blades of the helicopter propeller when the same is in its neutral, its positive and in its negative positons, that is when the propeller is at rest, when climbing, and when descending with power off.

Fig. 31 is the plan view of a streamlined hollow metal propeller to be used in connection with the modification shown in Figs. 22 and 23, showing the blades and the hub with its side wings.

Fig. 32 shows a series of sections along different parts of the blades and hub of the propeller shown in Fig. 31, from tip to tip thereof.

Figs. 33, 34, and 35 are sections taken respectively along lines 33—33, 34—34 and 35—35 of Fig. 36.

Figs. 36, 37, and 38 are respectively the side and end elevations, and front elevation of a wooden propeller showing the spreading fingers of metal with the bolt holes so arranged that no two of the same come longitudinally in line.

The invention is constructed and operated substantially and preferably as follows, it being understood of course that similar numerals of reference indicate similar parts throughout the several views:

1 is the fuselage or body, 2 the front, or airplane, or forward propulsion propeller, 3 is the top, or helicopter, or lifting propeller, 4 is the upper wing, 5 is the lower wing, 6 shows the ground wheels, 7 is the engine, 8 is the crank shaft, 9 is the gearing, 10 is the vertical driving shaft for the propeller 3; 11 is the hub of the top or helicopter propeller; 12 is the clutch on the vertical driving shaft, 13 is the servo motor therefor and 14 the operating handle thereof. 15 are the covers to the box 16 wherein the propeller 3 is retracted when not in operation, 17 are the ailerons, 18 the elevator and 19 the vertical rudder.

20 is the outer or slidable shaft, sliding in spline 21 on vertical shaft 10; 22 is the upper or main thrust bearing, 23 the lower stop for the shaft 20, 24 is a servo motor for lifting up the shaft 20 and propeller 3 to their operative positions as at 25. 26 are servo motors for opening the covers either slidably as in Fig. 9 or hingedly as in Fig. 10.

27 is a ratchet wheel on the shaft 10 operated by the lever 28 and dog 29 to turn the shaft 10 when the same is not being operated by power from the engine.

30 are the two pinions on the two blade shafts 31 operated by the two short racks 32 through the rod 33 which passes through the vertical shaft 10.

33 has the spline 34 and passes through the control clutch 35 operated by the lever 36. When the top propeller is pushed up by the servo motor 24 and lifts up the slide shaft 20, it also lifts up the inner rod 33. At 37 are two spring knobs 38 which contract when 35 passes over the same, but expands into small apertures 39 inside of 35 so that when the lever 36 is operated a change of inclination of the blades takes place. Each rib 41 has the box or space 42 with backing 47.

43 represents the general contour of the slipstream of the front propeller; and 44 represents the general or accepted contour of the top propeller. 45 shows how the slipstream of the front propeller is deformed by the simultaneous action thereon of the slipstream of the top propeller; and 46 shows the deformation that takes place in the slipstream of the top propeller due to the simultaneous action thereon of the slipstream of the front propeller carrying the slipstream of the top propeller over the elevator 18 and vertical rudder 19, aileron 17.

49 represents a landing place for an airplane as at an airport, or any field in which an airplane can land comfortably; 50 is the landing place on which no existing airplane could possibly land successfully, as on the deck of a ship for instance; 51 represents a place hemmed in by tall buildings, trees or the like from which only a helicopter could comfortably rise or descend.

54 is the front end or leading edge of the helicopter propeller when the same is not retractable into the wing, and 55 is the rear end or trailing edge. In order to compensate for the extra weight in the leading edge of the propeller the trailing edge may be made longer or otherwise changed. 56 is the covering or streamlining for the hub 11; the faring for the top thrust bearing 22 being shown at 57. 56 has oppositely disposed fixed wings or flares 58 which register with the two blades when the latter are in their neutral or horizontal positons as shown more particularly in Figs. 28 and 38.

The wooden propeller shown in Figs. 36, 37, and 38 has metal hands or fingers 65 with bolts 66 or the like placed in such a manner that no two of the bolts are longitudinally in line as shown at 67.

In taking off and landing at an ordinary airport or other landing field, the operation of the machine is exactly like that of any airplane. The helicopter propeller being retracted into the wing is not disturbed in any way, and no one seeing the machine would recognize it from an ordinary airplane.

In taking off from a very restricted place as from the deck of a ship 50 in Fig. 20, the pilot operates the levers of the servo motors 26 which open the covers 12 of the propeller box 13; he then pulls the lever of the servo motor 24 which lifts up the splined or slide shaft 20 placing the propeller in its operative position as at 25.

The clutch 12 is now thrown in by drawing over the lever or operating handle 14 of the servo motor 13, the angle of incidence of the blades of the propeller being at zero, or just as they were when recessed in the cut out portion of the ribs. The angle of incidence of the blades of the forward or airplane propeller is also brought to zero in any convenient and well known manner. The engine is now started to see if all is working well.

The pitch of the front propeller is changed to such a degree that its slipstream by playing over the controls will be enough to stabilize the craft on its three major axes when in the air. (Or instead of having a changeable pitch propeller forward, the same may be operated on a two-speed mechanism,—one enough to convey sufficient slipstream or wash to the controls so that the same will operate efficiently, and a second or full speed. At this instant the slower speed is in mesh.)

The pitch of the top propeller is now increased by operating the lever 36 of the control clutch 35 which catches the spring knobs 37 on rod 33 in their hollowed out place in 35, when the rod is moved up through 35 being drawn up by the blades when the servo motor pushes up the same.

When the said rod is pushed up it pushes up the short racks 32 which mesh with the two pinions 30 which turn the shafts 31 of the blades of 3 in opposite directions simultaneously.

In freezing weather a movement of the lever 27 operates the valves 28 and lets the hot exhaust gases come through the exhaust pipe 29 into the hollow shaft 10 and blades of 3, thawing out any particles of ice or the like before opening the doors or covers 15 of the propeller box 16.

The angle at which the fuselage is kept in respect to the horizon determines the progress of the machine forward at the present time. If this angle be kept at or near a certain angle so that the horizontal component of the front propeller be equal to the horizontal component of the top propeller (in a calm) the machine will rise directly vertically. If the elevator be lowered of course the fuselage will assume a more horizontal position and the machine will begin to travel slowly forward.

As soon as the machine has left the ground or the deck of a ship and has risen high enough to clear all surrounding obstacles, the operator lowers his elevator and the machine travels forward faster and faster as the weight of the machine is taken over more and more by the wings, until the machine is traveling at or a little over its stalling speed, when the pitch of the front propeller is increased to or near its maximum while the pitch of the top propeller is decreased to zero; when all of the weight of the machine will be taken up by the wings. The pitch of the top propeller is now turned to a negative angle when the torque of the same will be overcome and the clutch can be easily drawn. The pitch of the top propeller is now brought back to zero.

If it should happen that after he has stopped the top propeller the same has come to rest at an angle to its box instead of directly over the same, the operator pushes the handle or lever of the ratchet pawl, and turns the shaft by hand until the propeller comes exactly as the pilot wishes, that is parallel to the box opening, and lowers the same into the box and shuts the cover or covers.

The machine is now in all respects an airplane.

The pilot now places the machine in a power glide, or even a power dive, and gets up his speed in the air instead of running along the ground.

If the pilot is bound for an airport, when he reaches the same he glides down thereto as in ordinary airplane practice as the machine with its propeller retracted is exactly like an ordinary airplane.

But if on the other hand he intends landing on the deck of a ship or in some very restricted place where no run is possible, he will wish to helicopter to this landing. He therefore first opens the doors or covers, or cover, of the propeller box, forces up the telescopic arm with the blades of the helicopter propeller at a zero angle of incidence.

The blades are now brought to a negative angle of incidence, which, however, turns them in the correct direction; and with them the portion of the vertical shaft above the clutch. Almost immediately the blades and vertical shaft are revolving at practically the same rate of speed as the lower part of the vertical shaft which is driven by the engine. Now the clutch is thrown in without any effort as there is practically no torque on the shaft. It is not necessary, however, to wait until the exact speed is reached for the two jaws of the clutch to be meshed together,— if both shafts are turning in the same direction it is enough.

Immediately the negative angle of incidence of the blades is made positive; and the extra drag of the revolving helicopter propeller will soon bring the machine to a standstill in the air. The operator can now lower the machine to any landing he may pick out as slowly as he wishes; for he can go forward or even retreat rearwardly by placing the helicopter propeller more or less in yaw. He may also turn around on his vertical axis by pulling over the rudder more or less thereby counteracting the torque more or less. He can also hover over the spot as long as he wishes or has fuel, to survey the land which would be particularly advantageous in case of fog.

Should it happen that the engine commenced sputtering or stopped while ascending or descending vertically, or if this even should happen when traveling horizontally, the operator changes the pitch of the top propeller to negative and either throws out the clutch or throws off the compression of the engine by the lever 62 allowing the propeller to revolve freely. In order thereafter to have some means of braking the top propeller, a little more or less of the said compression can be thrown into the engine.

Should a wing break off or a control tear loose and jar the engine off or a ground wheel drop, while flying horizontally, as above stated the top propeller may be thrown up quickly reversed and the machine will come down in windmill fashion.

Therefore, looking at the retracted propeller from another angle it partakes of the nature of a safety or salvaging device in the case of the accidental stoppage of the engine where for instance the machine has stalled and has little or no forward speed with which to maneuver a glide to earth. In this case as above pointed out the helicopter propeller with reversed blades will bring the machine down in parachutic form. The airplane helicopter as shown has airplane surfaces mounted forward of the center of gravity, and portions mounted rearwardly thereof; it has a compartment disposed between the fore and aft portions of the supporting surface with an opening in the middle thereof with a compartment within the opening where the reversible pitch helicopter propeller, or dynamic salvaging device, is normally retained in an inoperative position, but capable of quick release therefrom; and it has means for automatically releasing or pushing up the device above the wing surface, and rendering the device operative.

The modification shown in Figs. 22–38 is operated in practically the same manner as above, only the propeller does not retract into a box, but remains permanently above the airfoil or wing, and takes a position parallel to the longitudinal center line of the craft when the same is travelling horizontally.

The extra drag or head resistance thrown in on account of the propeller being left in the open instead of being retracted has been found to be about one-eighth of the drag experienced by the landing wheels and their supports. That is if a machine with its landing gear will develop a certain speed with the same retracted, say 180 M. P. H. the same machine under the same circumstances will travel about eight miles an hour slower when the landing gear is down, or say about 172 M. P. H.

Therefore the modification described will travel one M. P. H. slower than if the helicopter propeller were retracted as in the machine shown in Figs. 1–21.

In order to accomplish having so little drag it is necessary to make the helicopter propeller of very streamlined form; and in order to do this the hub of the propeller is streamlined into the blades when the propeller is at rest and the angle of incidence of the blades is zero. Also the shaft and the thrust bearing that appear above the wing are streamlined. The blades themselves are also streamlined fore and aft and are given a form or section, as R. A. F. 34 for instance for practically their whole length as shown more particularly Figs. 28–38. When the blades are held transversely to the wing the front or leading edge or end of the propeller has the stub nose of a wing section while the rear or trailing edge or end chamfers off as usual in a wing.

As the invention is in some of its aspects generic, it is not limited to the particular construction shown or described, but also contemplates the employment of such equivalents as fairly fall within the scope of the claims.

In this connection it may be stated that the top propeller may be streamlined and yet be retracted; the machine can come down absolutely vertically, but this while very desirable is not necessary as the machine can come down at an angle and finish with a very small run if the terrain permits; the axis of the helicopter propeller is shown as positioned along the center of pressure and center of gravity of the machine, but the said axis may be moved either forward or backward of the said centers as desired; instead of throwing off the compression of the motor when coming down with reversed blades, if a friction clutch be used, more or less friction or compression thereof may be used to brake the shaft of the propeller; the sliding shaft of the helicopter propeller when retractable may be made stationary and permanently project beyond the wing and streamlined if desired, the propeller sliding up and down on the same; in Fig. 19 the vertical rudder may be located directly behind the central front propeller; or this rudder may be a double rudder each rudder being located directly behind the top blades of the three-bladed front propellers which are to the side of the said central propeller, so that the slip stream from these two impinge directly on the rudders, in this case all of the power of the central motor may be used for direct lift and none for forward movement, while the side motors give enough slip stream for the ailerons, elevator and the two rudders and also enough for some forward movement if desired—enough to soon bring the wings into play,—when however the machine travels forward all of the power of all of the motors is used for forward propulsion; in other words, going up vertically the top propeller is working 100%, the middle forward propeller 0%, and the two side propellers say 30%; the weight of the machine is now taken over from the top propeller to the wings through forward motion on a small scale, at which time the top propeller is operating at 0%, but all three of the forward propellers are working at 100%; in semi-stratospheric work this mode of operation will be very efficient for the machine instead of travelling a long distance in the atmosphere gradually getting up to say 25,000 feet, the machine can rise directly into the semi-stratosphere and start going where the going is fine.

Therefore it will be understood that various changes may be made in the form, proportion, size and detail of the several structures shown, the number and position of the several elements used, as well as the character of the motive power employed, without departing from the spirit of the invention.

This application is in the nature of an improvement on or continuation of a number of my previous applications: Serial No. 514,338 filed November 10, 1921, and Serial No. 20,568 filed April 3, 1925, through my companion applications Serial No. 555,204 filed April 18th, 1922, and Serial No. 621,180 filed February 26, 1923.

I claim:

1. The combination in a flying machine, of a retractable propeller with pivoted blades, a hollow shaft driving the propeller, a rod running through the hollow shaft and revolving therewith, means for lifting the rod vertically, means for lifting the rod vertically independently of the first mentioned means for lifting the same, and means operated by the rod for pivoting the blades of the propeller, and means comprising a ratchet mechanism for turning the propeller to a position transverse to the line of flight.

2. The combination in a flying machine, of motive power and throttle therefor, a controllable pitch helicopter propeller driven by the motive power, a wing having an opening therein directly underneath the propeller, a closure for the opening, and three means for changing the amount of slipstream passing into the opening: means for changing the revolutions per minute of the motive power, means for changing the pitch of the propeller, and means for operating the closure of the opening, one means being operable independently of the other.

3. The combination in a flying machine, of motive power and throttle therefor, a controllable pitch helicopter propeller driven by the motive power, a controllable pitch tractor propeller driven by the motive power, a wing having an opening therein directly underneath the helicopter propeller and in longitudinal alignment with the tractor propeller, a closure for the opening, and four means for changing the amount of slipstream passing into and over the opening: means for changing the revolutions per minute of the motive power, means for changing the pitch of the helicopter propeller, means for changing the pitch of the tractor propeller, and means for operating the closure of the opening, one means being operable independently of the other.

4. The combination in a flying machine, of motive power and throttle therefor, a controllable pitch helicopter propeller driven through a shaft operated by the motive power, a rod passing through the shaft, a wing having an opening therein directly underneath the propeller, a closure for the opening, and three means for changing the amount of slipstream passing into the opening: means comprising a lever operating the throttle for changing the revolutions per minute of the motive power, means for changing the pitch of the propeller by a vertical movement of the rod and means comprising a servo motor for operating the closure of the opening, one means being operable independently of the other.

5. The combination in a flying machine, motive power and a throttle therefor, a helicopter propeller, a clutch between the motive power and the propeller, a tractor propeller, means for changing the amount of thrust on each of the propellers one independently of the other, other means for changing the amount of thrust of each of the propellers independently one of the other, means for turning the machine on its longitudinal transverse and vertical axes, a wing having an open space between its upper and lower surfaces and curved on the top thereof with a different shape on the bottom, being washed by the slipstream of both of the said propellers, means for cutting off more or less of the slipstream that normally passes into the open space by a closure, and means when the motive power is not turning the helicopter propeller for rotating the same manually to a position parallel to the forward edge of the open space and its closure.

6. The combination in a flying machine, of a retractable helicopter propeller with pivoted blades, a hollow shaft for driving the propeller, a rod running through the hollow shaft, means for lifting the rod vertically, means for lifting the rod vertically independently of the first mentioned means for lifting the same, means operated by the rod for pivoting the blades of the propeller, and means comprising a ratchet mechanism for turning the propeller to a position parallel to the line of flight.

7. The combination in a flying machine, of a retractable helicopter propeller having pivoted blades, a hollow shaft for driving the propeller, a rod running through the hollow shaft, means for lifting the rod vertically, means for lifting the rod vertically independently of the first mentioned means for lifting the same, means operated by the rod for pivoting the blades of the propeller, and means comprising a ratchet mechanism for turning the propeller parallel to one of the major axes of the machine.

8. The combination in a flying machine, of motive power, means for driving the machine forward operated by the motive power, a helicopter propeller driven by the motive power, means for connecting and disconnecting the helicopter propeller from the motive power, and auxiliary means for rotating the helicopter propeller parallel to a line passing through one of the principal axes of the machine, the said auxiliary means comprising tooth-wheel mechanism mounted on the motive power.

9. The combination in a flying machine, of a fuselage, motive power, a set of revolving blades mounted at the forward end of the fuselage and driven by the motive power for propelling the machine forward, a standard fixed to the fuselage and above the same mounted to the rear of the motive power and the blades, a second set of revolving blades also driven by the motive power and mounted on and above the standard for upholding the machine in the air, and auxiliary means permanently attached to the motive power for manually turning the same parallel to a line passing through one of the major axes of the machine when the motive power is no longer driving the same.

10. The combination in a flying machine, of a fuselage, an engine mounted on the fuselage, gearing driven by the engine, suitable shafts for the engine and gearing, means for connecting and disconnecting the gearing in relation to the engine, a standard projecting fixedly above the fuselage, a plurality of blades mounted above the standard and driven by the gearing, and means permanently mounted on one of the shafts for rotating the blades when the gearing no longer drives the same.

11. The combination in a flying machine, of a motor, a telescopic shaft driven by the motor, a helicopter propeller having changeable pitch blades driven by the shaft, a wing having an opening in the top thereof of approximately the size of the propeller, a closure for the opening, and a clutch for the shaft; means for opening the closure, means for pushing up the telescopic shaft with the blades out of the opening, means for operating the clutch to throw on the power of the engine onto the telescopic shaft, and means for changing the inclination of the blades from a housing angle to a positive angle; the four means cooperating one with the other in substantially the order given to place the machine in vertical flight.

12. The combination in a flying machine, of a motor, a telescopic shaft driven by the motor, a helicopter propeller having changeable pitch blades driven by the shaft, a wing having an opening in the top thereof of approximately the size of the propeller, a closure for the opening, a clutch for the shaft, and a ratchet arrangement on the shaft; means for operating the clutch to throw off the power of the engine from the telescopic shaft, means for changing the inclination of the blades from a positive angle of incidence to a housing angle; means for opening the closure, means for turning the blades by the ratchet arrangement to a position transverse to the line of flight, means for lowering the telescopic shaft and the blades so that the latter are housed in the opening, and means for closing the opening; the said means cooperating one with the other substantially in the order given, to bring the machine to earth and then stow away the helicopter propeller.

13. In a flying machine having an engine, an upright telescopic shaft driven by the engine through a disconnectable drive, a rotor driven by the shaft having pitch changing mechanism with means for operating the mechanism, a body having an elongated opening in the top portion thereof containing the rotor when retracted, means for turning the rotor to a position parallel to the opening when the engine is no longer turning the same, means for operating the last mentioned means, and means for operating the rotor vertically, whereby the rotor is placed in condition for vertical flight, and thereafter during horizontal flight the rotor is lowered into the opening by the said three last mentioned means.

14. In a flying machine having an engine, wing surface, three dimensional control and tractor propeller blades driven by the engine; helicopter propeller blades also driven by the engine, changeable pitch mechanism for the helicopter blades with means for operating the same; a jaw clutch mounted between the engine and the helicopter blades, and means whereby the clutch may be thrown into engagement while the engine is running and the tractor blades are propelling the machine upheld by the wings at speed through the air with the helicopter blades stationary, by making the pitch of the stationary helicopter blades negative while the clutch is out of engagement so that the slipstream from the tractor blades plus the impinging air due to the forward speed of the machine will rotate the helicopter blades in a predetermined direction; and when a sufficient number of revolutions per minute is obtained and there is little or no torque on the clutch, the clutch is easily thrown into engagement.

GEORGE FRANCIS MYERS.